(12) United States Patent
Yu

(10) Patent No.: US 7,990,619 B2
(45) Date of Patent: Aug. 2, 2011

(54) LENS, LENS ARRAY HAVING SAME AND METHOD FOR MAKING SAME

(75) Inventor: Tai-Cherng Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 96 days.

(21) Appl. No.: 12/498,284

(22) Filed: Jul. 6, 2009

(65) Prior Publication Data

US 2010/0259830 A1  Oct. 14, 2010

(30) Foreign Application Priority Data

Apr. 8, 2009  (CN) .......................... 2009 1 0301414

(51) Int. Cl.
*B29D 11/00* (2006.01)
*G02B 27/10* (2006.01)
(52) U.S. Cl. ........................................ 359/619; 264/1.1
(58) Field of Classification Search .......... 359/619–628; 264/1.1
See application file for complete search history.

(56) References Cited

U.S. PATENT DOCUMENTS 4,572,611 A * 2/1986 Bellman et al. ............... 399/218
6,363,603 B1 * 4/2002 Nemoto et al. ................. 29/458

* cited by examiner

*Primary Examiner* — Joseph Martinez
*Assistant Examiner* — James R Greece
(74) *Attorney, Agent, or Firm* — Raymond J. Chew

(57) ABSTRACT

The present disclosure relates to a method for making a lens. In step 1, a first light pervious substrate and a second light pervious substrate are provided. The first light pervious substrate includes a first surface and an opposite second surface, and the second light pervious substrate includes a third surface and a fourth surface. In step 2, a first optically active part is formed on the first surface of the first light pervious substrate. In step 3, a second optically active part is formed on the third surface of the second light pervious substrate. In step 4, the fourth surface of the second light pervious substrate is attached to the second surface of the first light pervious substrate in such a manner that the first and the second optically active parts have a common optical axis.

1 Claim, 7 Drawing Sheets

LENS, LENS ARRAY HAVING SAME AND METHOD FOR MAKING SAME

BACKGROUND

1. Technical Field

The present disclosure relates to a lens, a lens array having the lens and method for making the lens.

2. Description of Related Art

In imprinting process, a double-sided imprinting mold is usually employed to produce a convex lens having double convex optically active parts. However, the double-sided imprinting mold is expensive. Furthermore, it is difficult to produce lenses in large quantity using the double-sided imprinting mold.

Therefore, a new method is desired to overcome the above-mentioned problems.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below with reference to the drawings.

Figure 1:
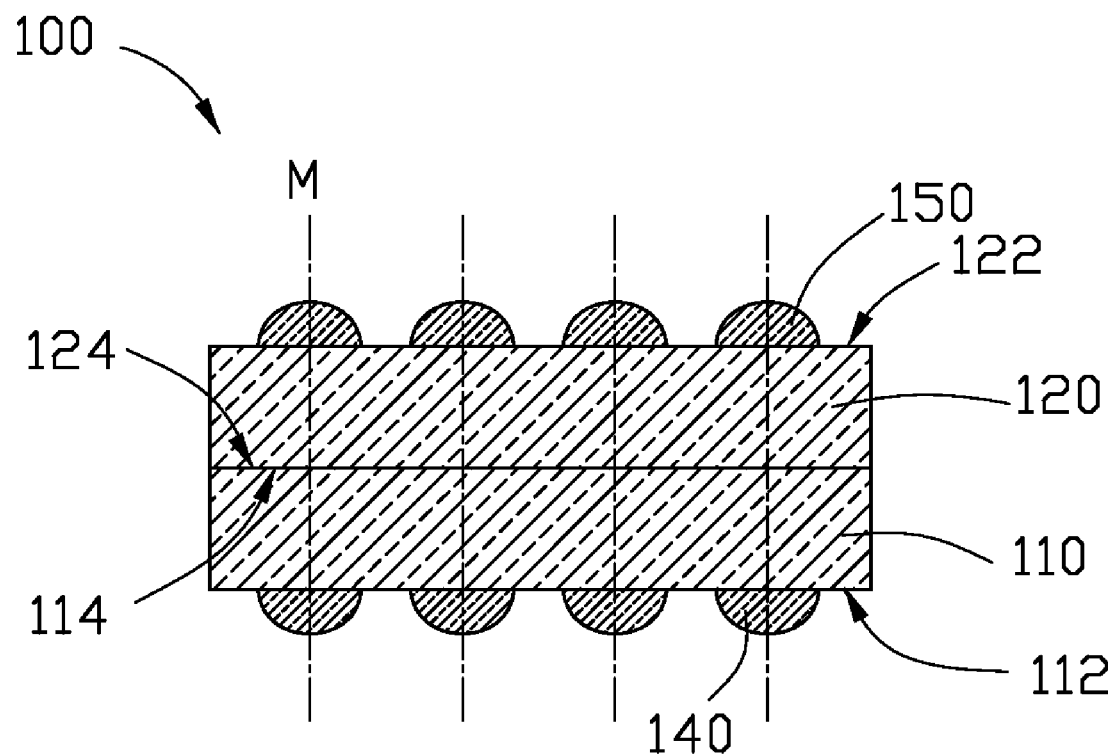
FIG. 1 is a cross-sectional view of a lens array according to an exemplary embodiment.

Referring to FIG. 1, a lens array 100 according to an exemplary embodiment is shown. The lens array 100 includes a first light pervious substrate 110, a second light pervious substrate 120, a plurality of first optically active parts 140 and a plurality of second optically active parts 150. The first light pervious substrate 110 includes a first surface 112 and an opposite second surface 114. The second light pervious substrate 120 includes a third surface 122 and a fourth surface 124. The second surface 114 of the first light pervious substrate 110 is adhered to the fourth surface 124 of the second light pervious substrate 120. The first optically active parts 140 are formed on the first surface 112 of the first light pervious substrate 110. The second optically active parts 150 are formed on the third surface 122 of the second light pervious substrate 120. Each first optically active part 140 and a corresponding second optically active part 150 have a common optical axis M.

A method for making the lens array 100 will be described in detail.

Figure 2:
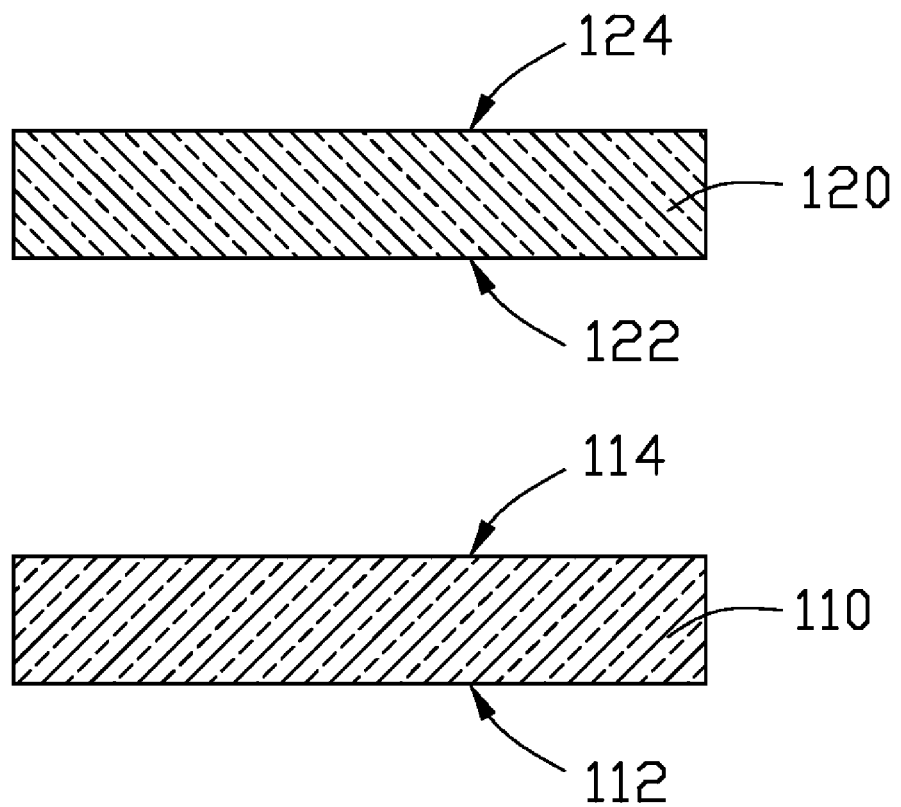
FIGS. 2-6 show successive stages of a method of making the lens array of FIG. 1.

In step 1, referring to FIG. 2, a first light pervious substrate 110 and a second light pervious substrate 120 are provided. The first light pervious substrate 110 includes a first surface 112 and an opposite second surface 114. The second light pervious substrate 120 includes a third surface 122 and a fourth surface 124. The first and the second light pervious substrate 110, 120 can be made of polymethyl methacrylate (PMMA).

Figure 3:
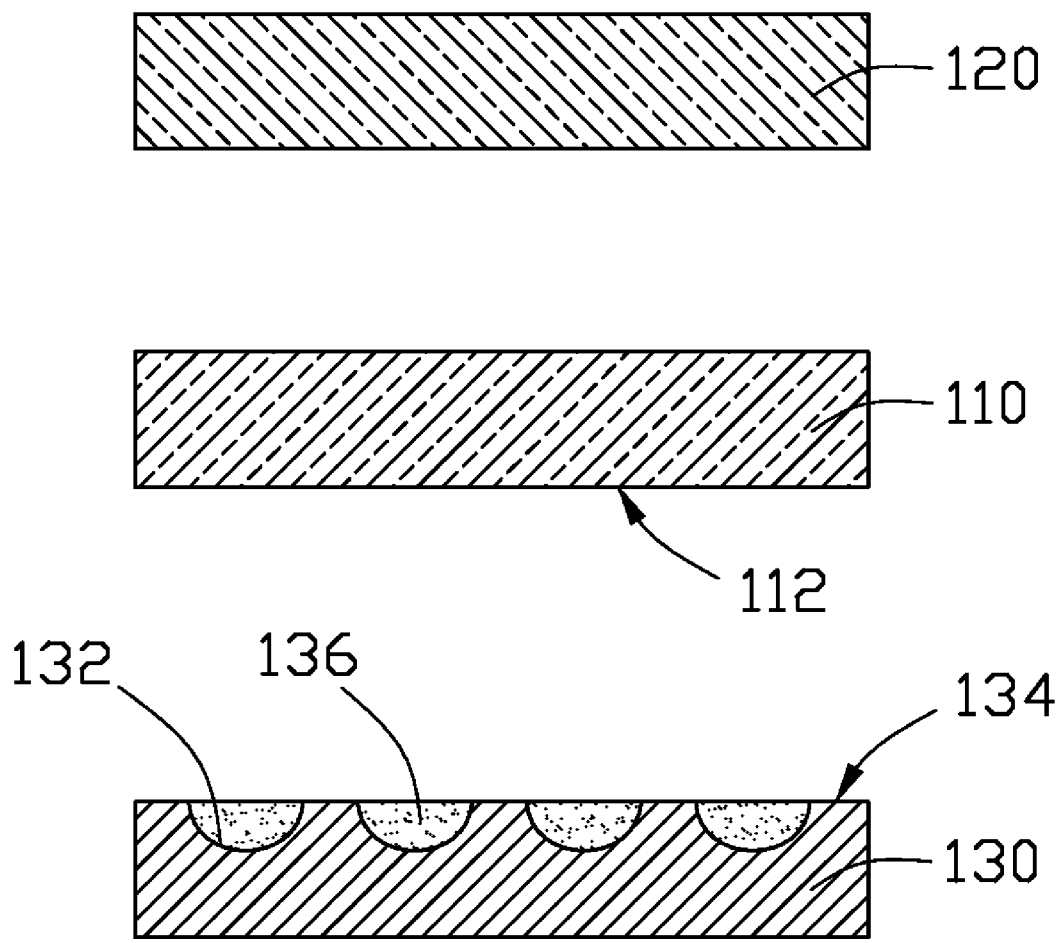

In step 2, referring to FIG. 3, an imprinting mold 130 is provided. The imprinting mold 130 includes a surface 134 and a plurality of molding cavities 132 defined in the surface 134. A to-be-solidified material 136 is applied in the molding cavities 132. The material 136 can be liquid or molten material. The material 136 can be, for example, epoxy ester.

Figure 4:
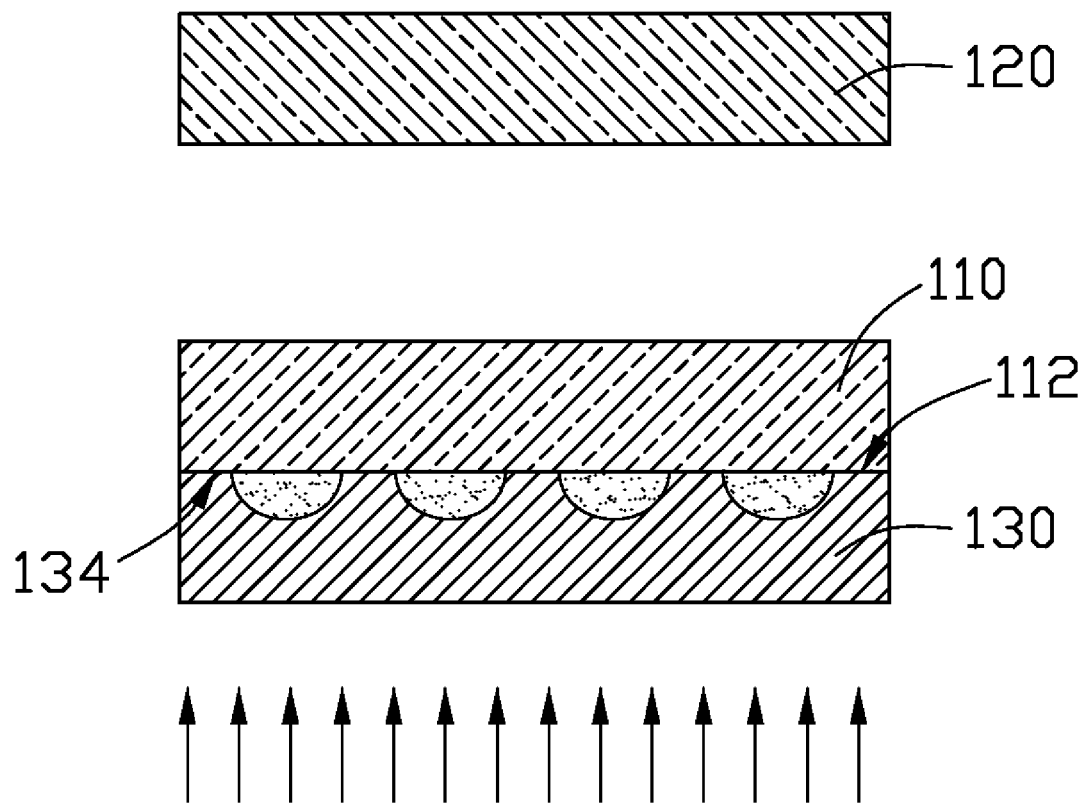

In step 3, referring to FIG. 4, the imprinting mold 130 is pressed towards the first light pervious substrate 110 in such a manner that the surface 134 of the imprinting mold 130 is in contact with the first surface 112 of the first light pervious substrate 110. Subsequently, the to-be-solidified material 136 is solidified by, e.g., ultraviolet light.

Figure 5:
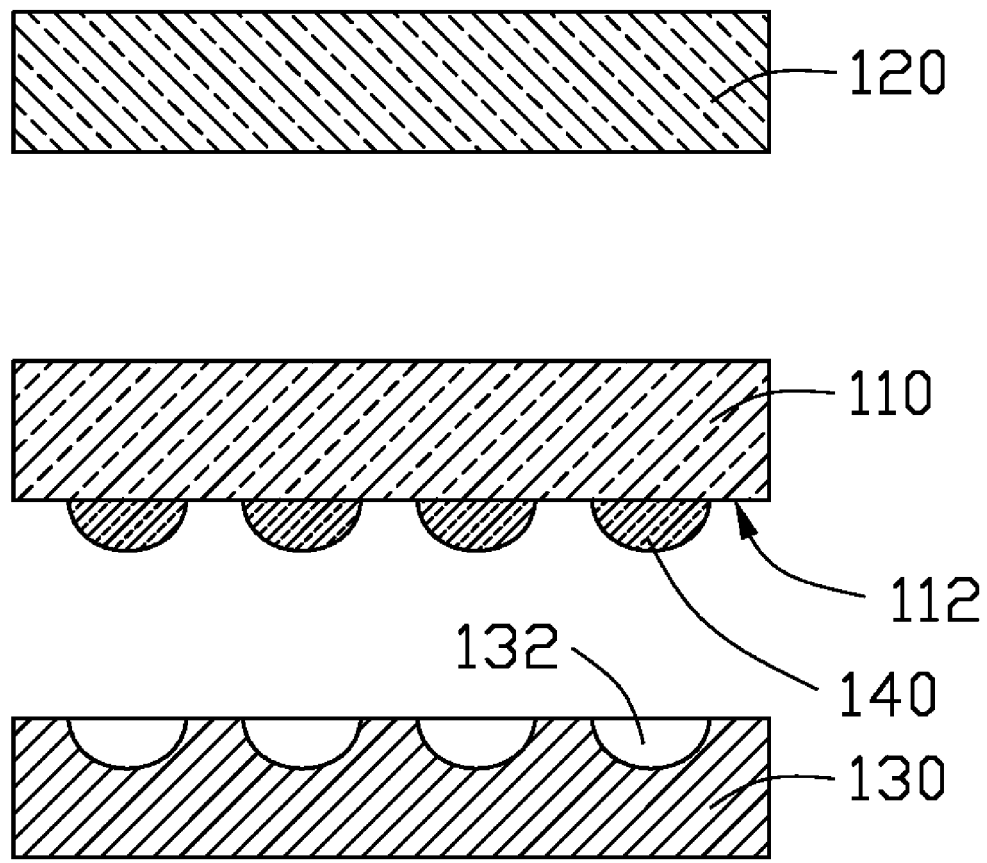

In step 4, referring to FIG. 5, the imprinting mold 130 is removed from the first light pervious substrate 110, thus forming a plurality of first optically active parts 140.

Figure 6:
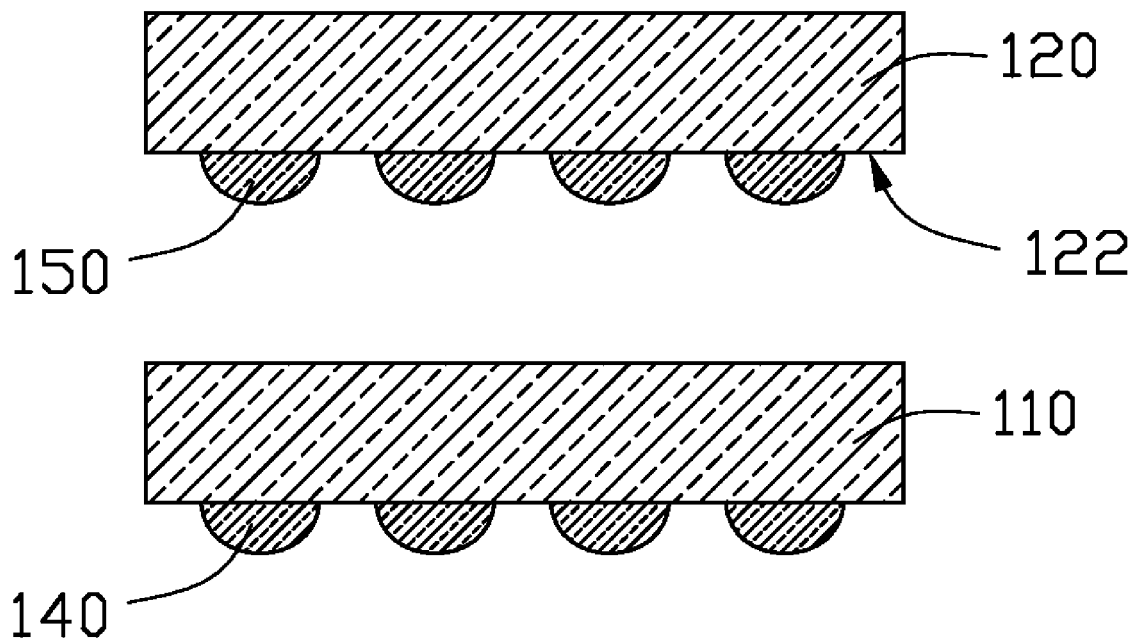
Figure 7:
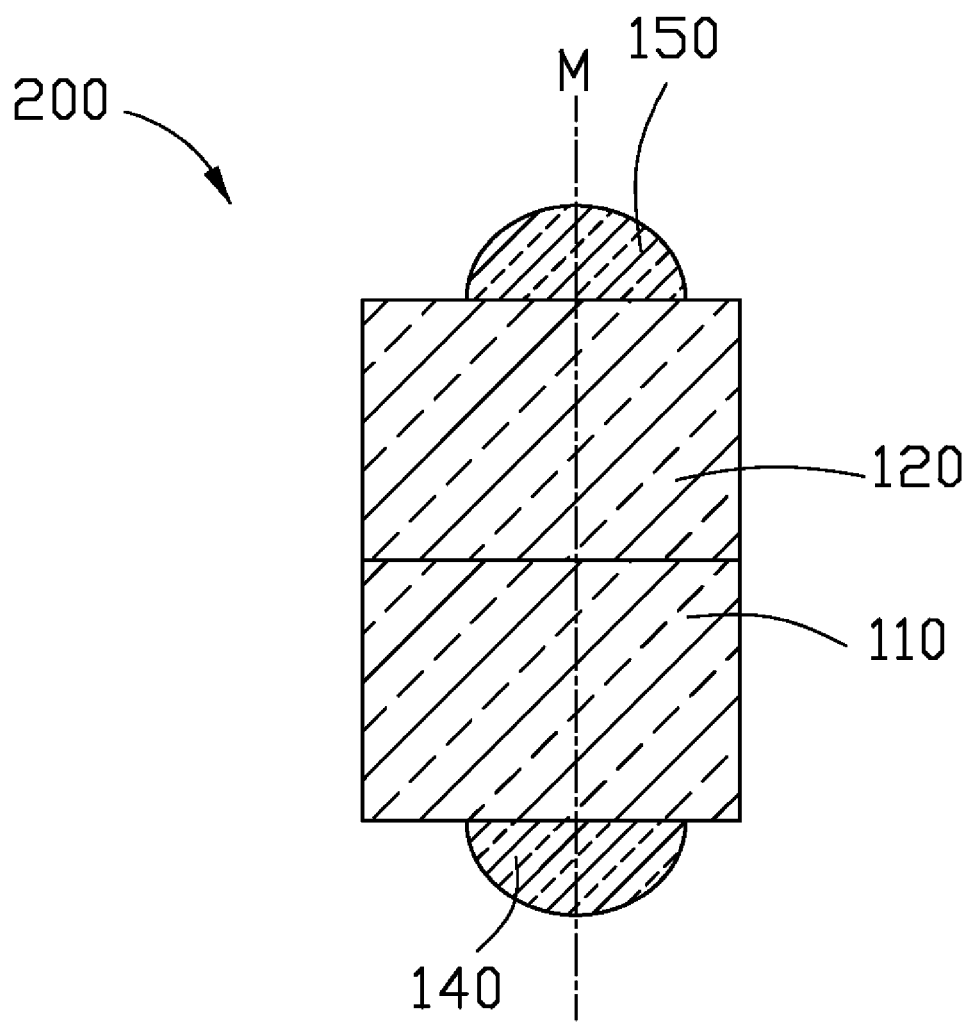
FIG. 7 is a cross-sectional view of a lens obtained from the lens array of FIG. 1.

In step 5, referring to FIG. 6, a plurality of second optically active parts 150 are formed on third surface 122 of the second light pervious substrate 120 using a method similar to the above method of forming the first optically active parts 140.

In step 6, referring to FIG. 1 again, the second surface 114 of the first light pervious substrate 110 is attached to the fourth surface 124 of the second light pervious substrate 120 such that each first optically active part 140 and a corresponding second optically active part 150 have a common optical axis M. Accordingly, a lens array 100 including a plurality of lenses, one of which is shown in FIG. 8, is formed.

It should be noted that the lens array 100 can be cut into a plurality of individual lenses 200, one of which is shown in FIG. 8.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A method for making a lens, the method comprising:
   providing a first light pervious substrate and a second light pervious substrate, the first light pervious substrate comprising a first surface and an opposite second surface, the second light pervious substrate comprising a third surface and a fourth surface;
   forming a first optically active part on the first surface of the first light pervious substrate, wherein the step of forming the first optically active part comprises:
      providing an imprinting mold, the imprinting mold comprising a surface and a molding cavity defined in the surface,
      applying a to-be-solidified material in the molding cavity of the imprinting mold,
      pressing the imprinting mold towards the first light pervious substrate,
      solidifying the to-be-solidified material, thus forming the first optically active part, and
      removing the imprinting mold from the first light pervious substrate;
   forming a second optically active part on the third surface of the second light pervious substrate, wherein the step of forming the second optically active part comprises:
      providing an imprinting mold, the imprinting mold comprising a surface and a molding cavity defined in the surface,
      applying a to-be-solidified material in the molding cavity of the imprinting mold,
      pressing the imprinting mold towards the second light pervious substrate,
      solidifying the to-be-solidified material, thus forming the second optically active part, and removing the imprinting mold from the second light pervious substrate; and attaching the fourth surface of the second light pervious substrate to the second surface of the first light pervious substrate in such a manner that the first and the second optically active parts have a common optical axis.

* * * * *